Aug. 23, 1960     S. W. JOHNSON     2,949,691
BAIT BOX
Filed Sept. 18, 1958
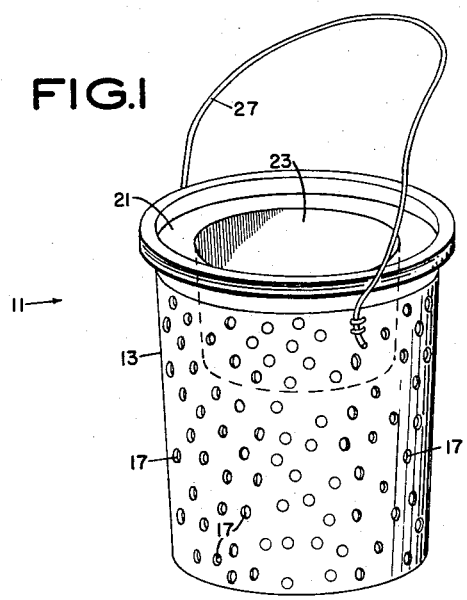
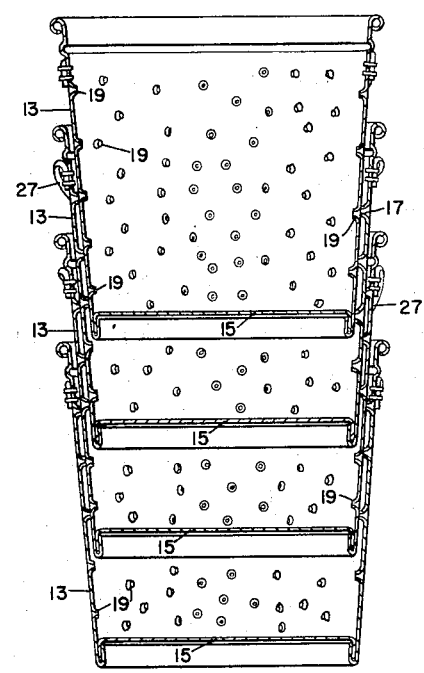
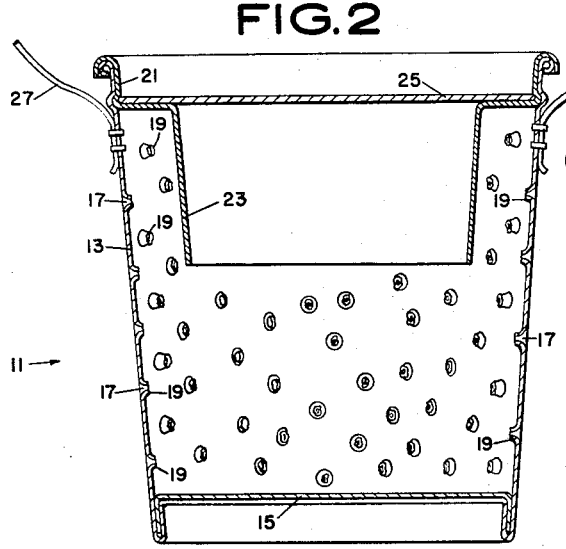
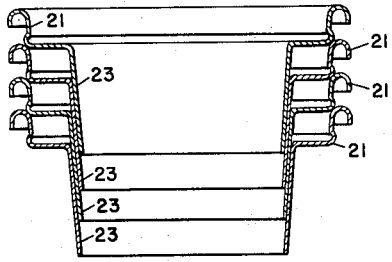
INVENTOR,
Sam W. Johnson

United States Patent Office 2,949,691
Patented Aug. 23, 1960

2,949,691

BAIT BOX

Sam W. Johnson, 674 Hewlett Road, Memphis, Tenn.

Filed Sept. 18, 1958, Ser. No. 761,773

3 Claims. (Cl. 43—55)

This invention relates to certain new and useful improvements in boxes or containers particularly adapted for the convenient housing of live bait such as crickets, roaches and the like for use by fishermen. As is well known to members of the piscatorial fraternity, use of live bait, particularly such as crickets or roaches is highly desirable in connection with certain types of fishing.

The problem of providing a suitable container for such live bait has been heretofore recognized. Among the principal problems which are encountered is the necessity of providing ventilation for the survival of live bait and to provide such containers in which the bait is enabled to climb within the interior of the container, in order to provide the bait housed in the container with means for avoiding an immovable mass in the bottom of the container which would tend to smother a number of the crickets or roaches housed in the container.

It has heretofore been proposed to provide climbing posts for bait such as roaches or crickets in order to solve the problem of avoiding the mass collected in the bottom of the container. These prior devices have presented difficulties of access to the bait within the container particularly in order to avoid the undesired escape of live bait from the container. Many devices have been provided utilizing a foraminous surface for providing ventilation, utilizing material such as screen wire or the like for this purpose. These devices have presented a great difficulty in that the crickets or roaches or similar live bait in attempting to climb upon such foraminous screen wire surfaces in a large number of occasions become entangled in the mesh of the foraminous surface and cannot readily be removed therefrom, also, on occasions, resulting in a damaging injury to the live bait so engaged with the mesh.

The present device contemplates the provision of a live bait container preferably formed of paper-board or similar material and including new and novel means for providing ventilation to the bait contained in the box while simultaneously facilitating the climbing by such bait to avoid massing in the bottom of the container. The present device further contemplates an internal collar so arranged and disposed as to inhibit climbing thereon, yet to provide access to the interior of the container by a fisherman or other user of the container.

The principal object of the present invention is to provide a new and novel container for live bait.

A further object of the invention is to provide such a container which is formed of paperboard or like material.

A further object of the invention is to provide such a device in which the side wall of the container is inwardly deformed to provide apertures through the wall for ventilation of the interior, with the material of the container wall so inwardly deformed providing nipples surrounding the apertures and providing ready means for climbing of the live bait contained in the bait box.

A further object of the invention is to provide such a container in which the side wall of the container is a downwardly tapered frusto-conical body together with an imperforate collar depending a short distance within the body of the container preferably substantially in parallelism to the side wall of the container.

A further object of the invention is to provide an access opening communicating through the collar for the introduction of the hand or other means of a fisherman or the user of the container for access to the bait contained therein; and A further object of the invention is generally to improve design construction and efficiency of containers for live bait for fishermen.

The means by which the foregoing and other objects of the invention are accomplished and the manner of their accomplishment will be readily understood from the annexed specification upon reference to the accompanying drawings in which:

Fig. 1 is a perspective view of the live bait container in accordance with the present invention.

Fig. 2 is a vertical sectional view of the container shown in Fig. 1 on a somewhat enlarged scale.

Fig. 3 is a vertical sectional view of a plurality of container bodies in nested condition.

Fig. 4 is a vertical sectional view of a plurality of covers in nested relation.

Referring now to the drawings in which the various parts are indicated by numerals, the bait box of the present invention is formed as of paperboard or like material providing a light weight yet durable container of inexpensive construction. The container, generally designated at 11, comprises preferably a downwardly tapered main body 13 which is here shown as of circular cross section comprising the frustum of an inverted cone. It will be understood that the cross-sectional shape of the container body may be varied without departing from the present invention, and that it may be formed of polygonal cross-section as square, octagonal or otherwise for the same purposes.

It is further preferred that the body of the container be downwardly tapered as shown in order that the container bodies may be nested together in the manner illustrated in Fig. 3 for purposes of shipment storage and the like with a conservation of space. It will however be understood that while this tapering of body 13 is desirable for the purpose of shipment and storage as mentioned, the body may be made without such taper without departing from the scope of the present invention.

Fixedly attached to the bottom of body 13 is a closure 15 which is preferably imperforate although if desired perforations may be formed therein although the same are not here shown. The wall of body 13 is as stated formed of paperboard or like material, preferably of the waxed or otherwise waterproof variety and the material of body 13 is inwardly deformed to provide a plurality of apertures 17 which are of a size to provide adequate ventilation to the interior of container 11 yet are sufficiently small to prevent the escape through any of the apertures of the contents of such container such as crickets, roaches or other live bait for which the bait box of the present invention is designed.

The deformation of the material of body 13 provides a plurality of inwardly protruding nipples 19, each of the apertures 17 being substantially surrounded by one of the nipples 19. It will be seen particularly from Fig. 2 that the nipples 19 project inwardly into the interior of container 11 and provide a ready means which crickets, roaches or similar bait may crawl upon and climb upwardly along the sloping walls of the container.

It will be further observed that since the nipples 19 are inwardly deformed there is no outward deformation of the body 13 of the container with the result that there are no projections providing undesired impedance either in the use of the device or in the nesting of the device in its preferred tapered body form.

Removably mounted on the top of the body 13 is a cover 21 which is preferably press fit into the top of body 13 in order to amount the cover thereon against accidental removal although the cover may be readily removed when desired as, for example, for storage or shipment of a plurality of the devices. Spaced inwardly from body 13, cover 21 is provided with a downwardly open collar 23 which is preferably downwardly tapered and forms a minor section of the frustum of a cone, which is disposed preferably in parallelism with body 13.

It will be observed that collar 23 is imperforate, providing an inwardly and downwardly sloping surface of unbroken material, the collar 23 and cover 21 being preferably integrally formed together although they may, if preferred, be formed separately and mounted together. It will be understood that it is preferred that the collar 23 be inwardly and downwardly tapered as shown, particularly in Fig. 2 of the drawings since the inward taper of the imperforate material provides a very poor surface for climbing or crawling by the bait such as crickets or roaches that may be contained in the container 11.

Additionally collar 23 projects a minor distance downwardly within container 11. It will be understood that collar 23, while shown as of circular cross-section and comprising the frustum of a cone, may also be formed of polygonal cross-section, but it is particularly preferred that the collar 23 be downwardly and inwardly tapered in order to inhibit the crawling thereon of any of the bait which may be contained in container 11.

In order to prevent the accidental spillage of the contents of container 11, as for example, during transportation of the container or the use thereof by a fisherman, as upon overturning, a removable lid 25 may be provided if desired. It will be observed that collar 23 upon the removal of lid 25 is open at top and bottom thus providing access means for the insertion of the hand of the fisherman or other means as he may desire to insert into container 11 for removal therefrom of a selected bait.

It will be seen that in view of the provision of body 13 with inwardly projecting nipples 19, bait contained within container 11 are provided with means by which they may climb upwardly from the bottom 15 of the container avoiding massing and consequently preventing the undesired smothering of bait contained in the container. The inwardly and downwardly sloping provision of collar 23 presents a surface upon which the live bait contained in the container cannot readily climb or crawl with the result that if one or more of the crickets or roaches in the bait box should climb to the top of container 11 and attempt to climb downwardly along collar 23, they will drop therefrom back to the bottom of the container and into the mass of bait contained therein. Thus the collar 23 prevents the undesired escape of bait from the container as for example when the lid 25 is removed therefrom for access to the interior of the container yet the collar is sufficiently open to permit access to the interior of the container by the user.

As is shown in Fig. 3, a plurality of the container bodies 13 may be nested together for storage or shipment or other such purposes, and as is additionally shown in Fig. 4, in the preferred embodiment of the invention, a plurality of covers 21 and suspended collars 23 may similarly be nested together for such storage or shipment purposes, both of these features providing for a desirable economy in space and in the preferred embodiments presenting greatly desirable attributes.

As has been heretofore indicated, variations in the structure of the several elements of the device may be adopted without departing from the spirit and scope of the present invention.

In order to provide for the convenient carriage of containers 11 as from place to place when in use, a suitable bail 27 may be provided which is here shown as being formed of a flexible material but which, if desired, may be formed of a rigid material.

It will be understood further that while the collar 23 is shown and described as depending downwardly from the cover 21, the collar may under certain circumstances be omitted entirely from the arrangement, and in other circumstances, particularly in connection with bait containers of small sizes, the collar may be inverted so as to extend upwardly from the cover 21 in contrast to the downward extension previously shown and described.

I claim:

1. In a container for live bait for fishermen, a main body of paperboard or the like, said body comprising a downwardly and inwardly tapered frustum of a cone, a bottom closure fixed to said body, a cover removably mounted on the top of said body, said cover including a depending, open, imperforate collar comprising a downwardly and inwardly tapered frustum of a cone spaced inwardly from and substantially parallel to said body, said collar extending downwardly from said cover within said body a relatively minor distance relative to the depth of said body and a distance in excess of the spacing of said collar inwardly from said body, the material of said body being outwardly substantially smooth and inwardly deformed to provide a plurality of ventilating apertures positioned in closely spaced relation throughout the surface area of said body, said body material so deformed providing a like plurality of inwardly protruding nipples integral with said body surrounding said apertures and projecting irregularly into the interior of said body.

2. In a container for live bait for fishermen, a main body, said body comprising a downwardly and inwardly tapered frustum of a cone, a bottom closure on said body, a cover removably mounted on the top of said body, said cover including a depending, open, imperforate collar comprising a downwardly and inwardly tapered frustum of a cone spaced inwardly from and substantially parallel to said body, said collar extending downwardly from said cover within said body a relatively minor distance relative to the depth of said body and a distance in excess of the spacing of said collar inwardly from said body, the material of said body being outwardly substantially smooth and inwardly deformed to provide a plurality of ventilating apertures positioned in closely spaced relation throughout the surface area of said body, said body material so deformed providing a like plurality of inwardly protruding nipples integral with said body surrounding said apertures and projecting irregularly into the interior of said body.

3. In a container for live bait for fishermen, a main body of paperboard or the like, said body being downwardly and inwardly tapered a bottom closure on said body, a cover removably mounted on the top of said body, said cover including a depending, open, imperforate collar downwardly and inwardly tapered, spaced inwardly from and substantially parallel to said body, said collar extending downwardly into said body a distance in excess of the spacing of said collar inwardly from said body, the material of said body being outwardly substantially smooth and inwardly deformed to provide a plurality of ventilating apertures positioned in closely spaced relation throughout the surface area of said body, said body material so deformed providing a like plurality of inwardly protruding nipples integral with said body surrounding said apertures and projecting irregularly into the interior of said body.

References Cited in the file of this patent

UNITED STATES PATENTS

| 1,523,612 | Sankstone | Jan. 20, 1925 |
| 2,225,089 | Vadnais | Dec. 17, 1940 |
| 2,346,744 | Glassman | Apr. 18, 1944 |
| 2,603,028 | Roberts | July 15, 1952 |

FOREIGN PATENTS

| 38,002 | Great Britain | Jan. 8, 1887 |